April 3, 1956  R. H. J. GENESLAY  2,740,946
SEISMOMETER
Filed Nov. 17, 1953

United States Patent Office 2,740,946
Patented Apr. 3, 1956

2,740,946
SEISMOMETER

Raymond Henri Joseph Geneslay, Viroflay, France, assignor to Compagnie Generale de Geophysique, Paris, France, a corporation of France Application November 17, 1953, Serial No. 392,731

Claims priority, application France December 16, 1952

4 Claims. (Cl. 340—17)

My invention has for its object improvements in seismographs used for geophysical researches. I will first define the problem to be solved by referring to accompanying drawings, wherein.

Figures 1, 2, 3:
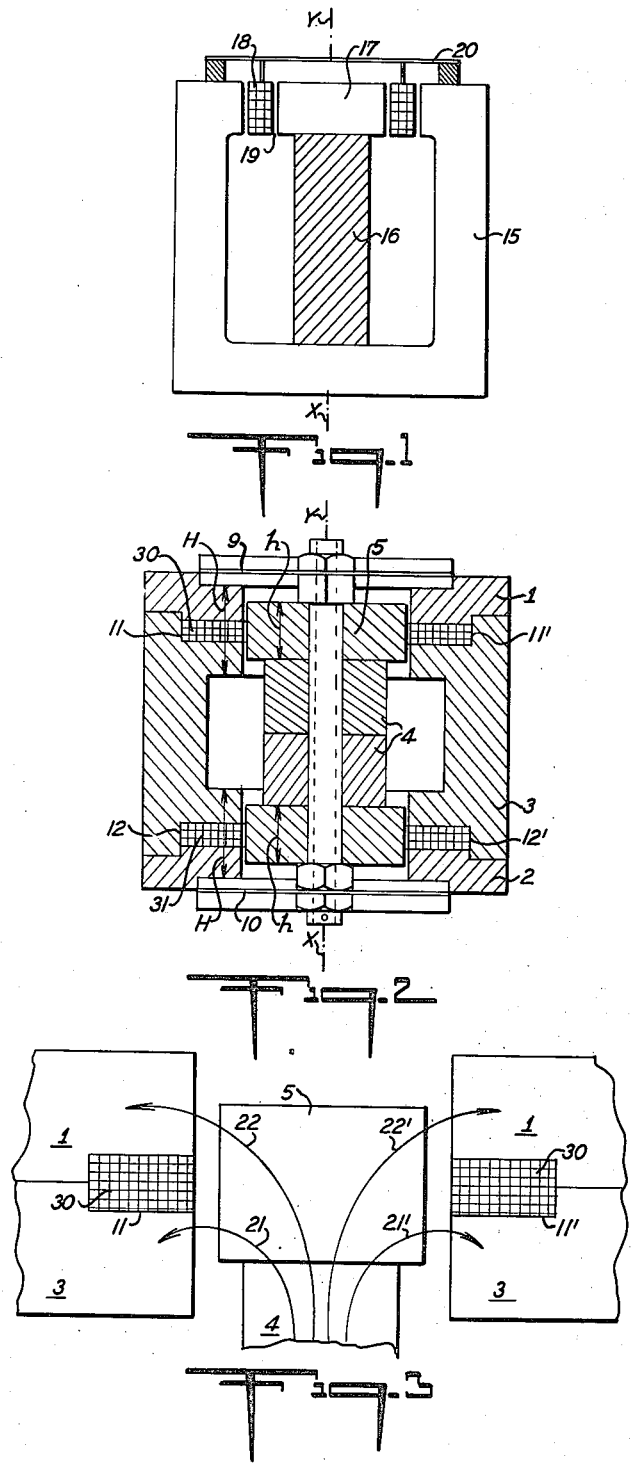
Fig. 1 shows a conventional seismograph adapted to transform the movement of a movable system into electric voltages.
Fig. 2 shows an embodiment of my invention as applied to a seismograph including two radial gaps to either side of a plane of symmetry perpendicular to the axis of revolution of the instrument.
Fig. 3 is an explanatory diagram.

Turning to Fig. 1 which is a diametrical cross-section of a conventional seismograph, it is apparent that the latter includes chiefly a magnetic field defined by a body of revolution surrounding the axis $xy$. Said magnetic field includes an outer section 15 made of mild steel and an inner axial section including a permanent magnet 16 and a pole piece 17, also made of mild steel, the parts 15, 16 and 17 being mechanically connected to form a unitary system.

The movable part of said conventional seismograph is constituted by a coil 18 adapted to move inside the annular gap 19 formed in the outer section and surrounding the pole-piece 17. A coil-guiding system similar to that used in loudspeakers is provided and includes a flexible member 20 which allows the movable coil to oscillate freely in the direction of the axis $xy$ while preventing any lateral movement thereof.

Under the action of the vibrations transmitted through the ground, the movable coil vibrates axially, which leads to the production of an electromotive force inside the coil 18 and this in its turn produces the desired transformation of mechanical vibrations into electric voltages.

In such conventional seismographs, the movable coil associated with yielding current-feeding wires forms a weak point, inasmuch as it is not protected and is consequently liable to damage when the instrument is being handled; dismantled, adjusted or the like. Furthermore, the necessity of housing the coil inside the gap leads to an increase in the breadth of the latter, whereby the value of the magnetic field is reduced by a corresponding amount, the conditions remaining otherwise identical.

These various drawbacks are avoided by the improvements according to my invention, which provides for the permanent location of the coil or coils transforming the vibrations of the movable section into electric voltages, on the stationary part of the magnetic circuit, said coil or coils being housed inside notches formed in said stationary section.

In Fig. 2, showing an embodiment of a seismograph according to my invention, there are provided two annular gaps lying in radial planes extending to either side of a plane of symmetry perpendicular to the axis of revolution $xy$ of the magnetic field. The latter includes two flanges 1, 2 connected with each other by means of a cylindrical member 3, while the movable part of the instrument is constituted by a magnet 4, carrying at both ends respectively pole pieces 5 and 6, made preferably of mild steel, and moves, as shown, inside an axial bore passing through the members 1, 2, 3 of the magnetic field.

A portion of the flanges 1 and 2 is constituted, as shown, by extensions of the member 3. There is also provided a guiding system, as precedingly, for the movable section, said guiding system including the symmetrical elastic members 9 and 10.

The coils 30, 31 are stationary and are housed inside the notches 11, 11' and 12, 12' located as shown in the wall of the bore inside the field, to register with the parts of the bore in which the pole pieces 5 and 6 are adapted to move.

The height $h$ of the pole pieces 5 and 6 measured in the direction of the axis $xy$, is smaller than the height $H$ of the bore sections extending through the flanges 1, 2 and member 3. Thus, each pole-piece remains enclosed inside the corresponding bore section defining a gap therewith and the reluctance of the magnetic circuit remains substantially constant, when the movable part 4, 5, 6 executes movements of a small amplitude therein. In contradistinction, during such movements, the magnetic flux passing through the coils 30 and 31 varies.

Fig. 3 is a partial enlarged view of the instrument shown in Fig. 2 and examination thereof allows an explanation to be given of such a variation of the magnetic flux, said Fig. 3 showing, on an enlarged scale, the upper gap and associated elements. Assuming the movable part 4, 5, 6 is moving upwardly, a number of lines of force, such as 21, 21', which did not originally surround the annular coil 30, are shifted into a position 22, 22' for which they surround the coil and produce consequently a modification in the flux entering said coil.

Obviously, if the coils 30 and 31 are wound in opposide directions, the electromotive forces induced in each coil by such modifications in the magnetic flux, assume the same direction and add up.

It is immediately apparent that the movable section may, consequently, be executed as a mechanically resistant member, since it includes only metal elements without any winding thereon.

On the other hand, the coils are premanently secured inside the notches that may be partly or completely closed, along their edges facing the gap, by means of a suitable insulating material so that said coils cannot in practice be submitted to any damage and, furthermore, it is no longer necessary to feed any current to the coils through flexible wires.

Experience shows that, with a suitable sizing of the different parts, it is possible to obtain, in seismographs of this type, the same sensitivity as or even a greater sensitivity than in the case of conventional instruments.

The damping of the instrument is also easy to execute since it is possible to size the different parts of the seismograph within a far wider range than in the case of conventional types; in particular, the cross-sections of the coils 30, 31 are not limited as in the case where they are to be housed inside a gap and, furthermore, the mass of the movable section may be comparatively small by reason of the movements of said movable section being small in practice and consequently, the height $h$ of each pole piece 5 or 6 may be only slightly larger than the thickness, measured in the direction of the axis, of the notch 11, 11' or 12, 12'. Thus, the mass of the steel magnet 4 may be chosen very small, if required.

Obviously, for a predetermined mass of the movable section, it is easier to produce a seismograph of reduced bulk in accordance with my improved type, than in accordance with the conventional movable coil type.

A further important advantage of my invention consists in that, when the pole pieces 5 and 6 move, the reluctance of the magnetic circuit actually varies to a light extent, since the flux of the magnetic leaks is not the same for the different relative positions of the pole-pieces 5 and 6 with reference to the corresponding notches 1, 11' and 12, 12'. The consequence is that the movable section is submitted to an axially directed magnetic force. It is, therefore, possible to suitably locate the pole pieces 5, 6 with reference to the notches 11, 11' and 12, 12' so as to make said magnetic force oppose the force produced by the flexible members 9 and 10. Thus, it is possible to produce a seismograph having a low natural frequency although it includes elastic members having, when considered alone, a high natural frequency. This allows executing low frequency seismographs which assume a mechanical resistance that is quite as considerable as that of high frequency seismographs.

It should be remarked that, in the seismograph according to the invention, the electromotive force produced is due to a modification of the flux passing through the coil, while the total flux passing through the magnetic circuit remains constant, at least as a first approximation; this distinguishes the instrument from those wherein the electromotive force is produced inside a stationary coil only through a modification of the magnetic flux due to a modification in the reluctance of the magnetic circuit as produced by a movement of the movable section of the instrument.

Obviously, many modifications may be brought to the embodiment described and illustrated, without unduly widening thereby the scope of the invention as defined in accompanying claims; thus, the shape of the cross-section of the notches may be modified and the instrument may include a single coil instead of two or again, a plurality of notches may be cut in register with the same gap.

What I claim is:

1. In a seismometer; the combination of a cylindrical member of magnetic material having annular flanges extending radially inward therefrom at the opposite ends of said member, a permanent magnet mounted coaxially within said member and movable axially relative to the latter, pole pieces at the opposite ends of said magnet and having cylindrical outer surfaces with the diameters of the latter being only slightly less than the inner diameters of said flanges thereby to define narrow annular gaps between the inner edge surfaces of said flanges and the cylindrical surfaces of the related pole pieces, means securing together said magnet and pole pieces to define a movable assembly, at least one of said flanges having an annular groove in the inner edge surface thereof opening radially into the related gap, and a magnetic coil disposed in said annular groove, the axial dimension of at least said one flange being substantially greater than the axial dimension of the related pole piece, while said axial dimension of the related pole piece is substantially greater than the axial dimension of said groove.

2. In a seismometer; the combination according to claim 1; further comprising resilient members extending between the opposite ends of said cylindrical member and the adjacent ends of said movable assembly to normally retain the latter in an axial position wherein said pole pieces are disposed symmetrically with respect to the radial medial planes of the adjacent flanges.

3. In a seismometer; the combination of a cylindrical member of magnetic material having annular flanges extending radially inward therefrom at the opposite ends of said member, each of said annular flanges having a relatively narrow annular groove opening radially inward at the inner surface of the flange and substantially centrally located with respect to the axial dimension of the latter, a magnetic coil in each of said grooves, a movable assembly including a permanent magnet and pole pieces at the opposite ends thereof, and resilient means extending between the opposite ends of said cylindrical member and the adjacent ends of the movable assembly and mounting the latter coaxially within the cylindrical member for axial movement with respect to the latter, said pole pieces having diameters which are only slightly smaller than the diameters of the inner surfaces of the flanges to define narrow gaps therebetween into which said grooves open, said movable assembly being axially dimensioned so that, in the normal axial position thereof as established by said resilient means, said pole pieces are symmetrically located with respect to the radial medial planes of the related flanges, the axial dimensions of said flanges being substantially greater than the axial dimensions of the related pole pieces, while said axial dimensions of the pole pieces are substantially greater than the axial dimensions of the grooves in the related flanges.

4. In a seismometer; the combination according to claim 3, wherein the magnetic coils in said grooves of the flanges at opposite ends of the cylindrical member are oppositely wound so that, in response to any axial displacement of the movable assembly from said normal positions, the variations of the electromotive force induced in said coils are in the same direction and may be added together to provide a relatively strong indication, and any magnetic field outside of the seismometer provides opposed reactions in said coils to cancel out each other and thereby maintain the seismometer substantially free of any influence by such outside magnetic fields.

References Cited in the file of this patent

UNITED STATES PATENTS

| | | |
|---|---|---|
| 1,823,326 | Legg | Sept. 15, 1931 |
| 2,130,213 | Wolf et al. | Sept. 13, 1938 |
| 2,296,754 | Wolf et al. | Sept. 22, 1942 |
| 2,303,413 | Washburn | Dec. 1, 1942 |
| 2,472,127 | Slason | June 7, 1949 |
| 2,540,796 | Stanton | Feb. 6, 1951 |